(12) United States Patent
Choudhury

(10) Patent No.: US 9,966,841 B2
(45) Date of Patent: May 8, 2018

(54) POWER FACTOR CORRECTION

(71) Applicant: Texas Instruments Incorporated, Dallas, TX (US)

(72) Inventor: Shamim A. Choudhury, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

(21) Appl. No.: 14/715,051

(22) Filed: May 18, 2015

(65) Prior Publication Data

US 2016/0344281 A1   Nov. 24, 2016

(51) Int. Cl.
*H02M 1/42* (2007.01)

(52) U.S. Cl.
CPC ......... *H02M 1/4225* (2013.01); *Y02B 70/126* (2013.01)

(58) Field of Classification Search
CPC ............................ H02M 1/4225; H02M 1/4208
See application file for complete search history.

(56) References Cited

U.S. PATENT DOCUMENTS

| | | | |
|---|---|---|---|
| 8,861,230 B2 * | 10/2014 | Sigamani | H02M 1/4225 363/34 |
| 9,231,469 B2 * | 1/2016 | Miao | H02M 1/4225 |
| 2007/0067069 A1 * | 3/2007 | Markowski | H02M 1/4225 700/297 |
| 2008/0310201 A1 * | 12/2008 | Maksimovic | H02M 3/1584 363/85 |
| 2008/0315852 A1 * | 12/2008 | Jayaraman | H02M 1/4225 323/285 |
| 2013/0076317 A1 * | 3/2013 | Yeh | H02M 1/4225 323/209 |
| 2014/0097808 A1 * | 4/2014 | Clark | G05F 1/70 323/208 |
| 2015/0117074 A1 | 4/2015 | Miao | |
| 2015/0188413 A1 * | 7/2015 | Choudhury | H02M 1/4208 307/31 |
| 2016/0065054 A1 * | 3/2016 | Li | H02M 1/4225 363/89 |

FOREIGN PATENT DOCUMENTS

CN   103840652   6/2014

OTHER PUBLICATIONS

International Search Report for corresponding PCT Application No. PCT/US2016/033138, dated Sep. 8, 2016 (2 pages).

* cited by examiner

*Primary Examiner* — Timothy J Dole
*Assistant Examiner* — Sisay G Tiku
(74) *Attorney, Agent, or Firm* — Kenneth Liu; Charles A. Brill; Frank D. Cimino

(57) ABSTRACT

A power supply includes a power factor correction module that is real-time adaptive based on the operating conditions.

15 Claims, 2 Drawing Sheets

POWER FACTOR CORRECTION

BACKGROUND

Electrical power supplies commonly use diode rectifier circuits to convert from alternating current (AC) to direct current (DC). A diode rectifier conducts current only when the input voltage of the rectifier exceeds the output voltage of the rectifier, so a sinusoidal input voltage results in intermittent non-sinusoidal current flow. The intermittent current flow has a primary frequency component equal to the AC input frequency and substantial energy at integer multiples of the AC input frequency (harmonics). Input current harmonics can cause transient current flow in the AC mains, which can increase the power required from the AC mains and can cause heating of the distribution system. In addition, input current harmonics create electrical noise that can interfere with other systems connected to the AC mains. Increased power, heating, and electrical noise are especially important considerations for Uninterruptable Power Supply (UPS) systems used to provide AC power in large computer server systems.

The power factor of a power supply is the ratio of the real power delivered to a load divided by the apparent input power, where the apparent input power is the Root-Mean-Square (RMS) input voltage times RMS input current. In general, input current harmonics cause the RMS value of the input current to be substantially higher than the current delivered to the load. Many power supplies include power factor correction to reduce input current harmonics. Some jurisdictions legally require power factor correction for supplies with output power over a specified limit, which includes most power supplies for computer systems.

FIG. 1A illustrates an example of part of a power supply 100 (simplified to facilitate illustration and discussion) with conventional power factor correction. An AC input voltage Vi is rectified by a full-wave rectifier 102. An inductor 104 provides energy storage to enable a continuous input current. A power factor correction (PFC) module 106 controls an electronic switch 108 using pulse-width-modulation (PWM) to control the DC output voltage $V_B$ and to generate a continuous sinusoidal input current in phase with the input voltage Vi. The circuit illustrated in FIG. 1A may be a front end to a DC-DC converter. Alternatively, there may be multiple inductors and switches driving multiple DC outputs, which in turn may connect to multiple DC-DC converters.

FIG. 1B illustrates an example of additional detail for the PFC module 106 in FIG. 1A. The output bus voltage $V_B$ is subtracted from a reference voltage $V_{REF}$ at a summing node 110. The resulting voltage error signal is input to a voltage loop controller 112, which regulates the bus voltage $V_B$ to be equal to $V_{REF}$. An RMS calculator 114 computes the inverse of the square of the RMS value of the input voltage Vi. The output of controller 112 is multiplied by $1/Vi^2_{RMS}$ by a multiplier 116. That result is multiplied by the input voltage $V_i$ by a multiplier 118 with a gain of K, the value of which depends on system parameters. That result is used as a sinusoidal reference signal $i_{REF}$ for a current control loop. Sensed current $I_{SEN}$ is subtracted from the reference current signal $i_{REF}$ at a summing node 120, and resulting current error signal is processed by a current loop controller 122, and the result is used to generate the PWM output that controls the electronic switch 108.

For some power supplies, such as power supplies used for computer servers, the operating conditions may vary widely, with input voltages ranging from 90V to 264V, and output loads varying from zero to full load. Under such varying operating conditions, the PFC power stage characteristics can change significantly, which results in a corresponding significant change in gain, bandwidth, and stability margins (phase margin and gain margin) of the current control loop, making it difficult to achieve a good power factor and low input current total harmonic distortion (THD) under all operating conditions, especially for light loads and high input voltages.

DETAILED DESCRIPTION

As discussed above, it is difficult to achieve a high power factor and low THD under all operating conditions, especially for light loads and high input voltages.

In the improved design discussed below, instead of using a fixed current loop controller for all operating conditions, a power factor controller uses an adaptive current loop controller that changes depending on the operating conditions. In a firmware implementation, a system controller switches among sets of control coefficients for the current loop controller, maintaining a high current loop gain for a wide range of operating conditions.

Figure 1A:
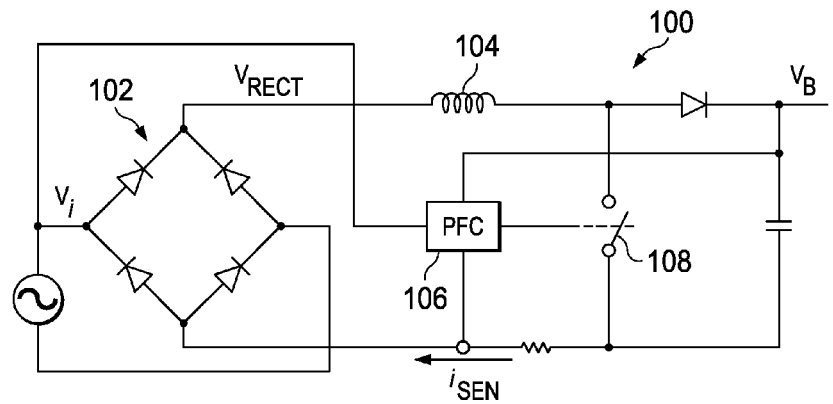
FIG. 1A is a block diagram schematic of an example embodiment of part of a conventional power supply with power factor correction.
Figure 1B:
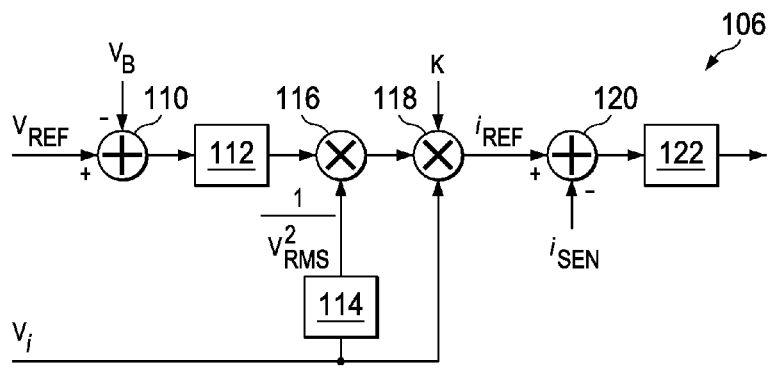
FIG. 1B is a block diagram schematic illustrating additional detail for a power factor correction module illustrated in FIG. 1A.
Figure 2A:
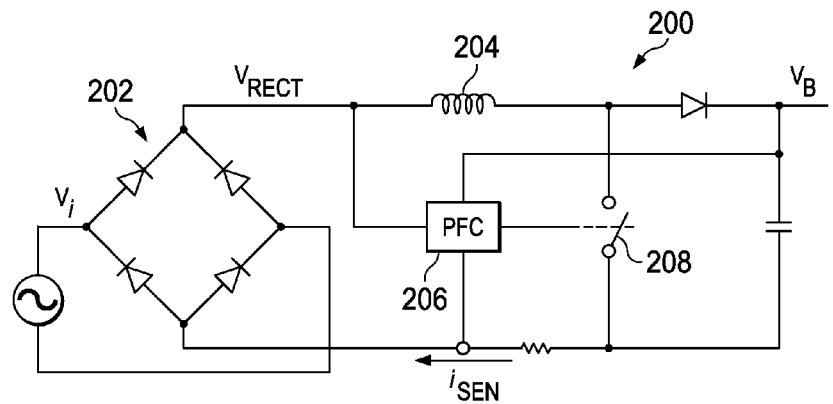
FIG. 2A is a block diagram schematic illustrating an example embodiment of part of a power supply with improved power factor correction.

FIG. 2A illustrates an example of part of a power supply 200 (simplified to facilitate illustration and discussion) with improved power factor correction. An AC input voltage Vi is rectified by a full-wave rectifier 202. An inductor 204 provides energy storage to enable a continuous input current. A PFC module 206 controls an electronic switch 208 using PWM to control the DC output voltage $V_B$ and to generate a continuous input current matching the shape of the rectified input voltage $V_{RECT}$ and in phase with $V_{RECT}$. Note that the PFC module 206 in FIG. 2A uses the rectified input voltage $V_{RECT}$ instead of the AC input voltage Vi as in FIG. 1A.

Figure 2B:
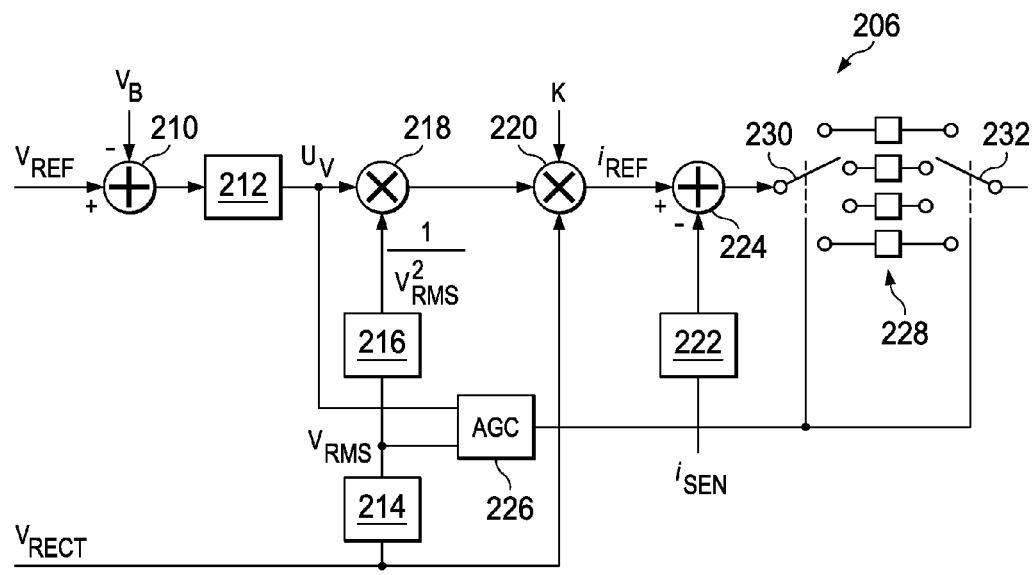
FIG. 2B is a block diagram schematic illustrating additional detail for a power correction module illustrated in FIG. 2A.

FIG. 2B illustrates example additional detail for the PFC module 206 in FIG. 2A. The output bus voltage $V_B$ is subtracted from a reference voltage $V_{REF}$ at a summing node 210. The resulting voltage error signal is input to a voltage loop controller 212, which regulates the bus voltage $V_B$ to be equal to $V_{REF}$. The output $U_V$ of the voltage loop controller 212 is then multiplied by three parameters (K, $1/V^2_{RECT(rms)}$, and $V_{RECT}$) to form a reference current $i_{REF}$. A RMS calculator 214 computes the RMS value of the rectified input voltage $V_{RECT}$. A calculator 216 computes the inverse of the square of the RMS value of the rectified input voltage $V_{RECT}$. The output $U_V$ of the voltage loop controller 212 is multiplied by $1/N^2_{RECT(rms)}$ by a multiplier 218. That result is multiplied by the rectifier output voltage $V_{RECT}$ by a multiplier 220 with a system dependent gain of K. That result is used as a reference current signal $i_{REF}$ for a current control loop. The variable gain K is used to adjust the range of the reference current signal $i_{REF}$ to the full range of the input voltage Vi. Sensed current $i_{SEN}$ is oversampled and averaged by a sampling and averaging module 222 and the averaged result is subtracted from the reference current signal $i_{REF}$ at a summing node 224. An automatic gain control (AGC) module 226 controls the selection of one of a plurality of current loop controllers 228, each of which has gain and control coefficients appropriate for a particular input voltage range and load range. The current error signal from the output of summing node 224 is input to a selected current loop controller 228, and the result is used to control the PWM duty-cycle of the electronic switch 208 so that the output voltage $V_B$ is equal to $V_{REF}$ and the current $i_{SEN}$ tracks the shape and phase of the reference current signal $i_{REF}$. Note that $i_{SEN}$ is both the input current and the output current, so that controlling $i_{SEN}$ also controls the power factor.

In the example of FIG. 2B, the selector of a current controller 228 is depicted as a switch 230 and the coupling of the output of the selected current controller 228 is depicted as a switch 232, but these can also be implemented as a multiplexer and a demultiplexer, or by firmware in a system controller. In one embodiment, essentially everything in the PFC module 206 is implemented by firmware in a system controller.

The AGC module 226 receives at least one calculated operating parameter. In the example of FIG. 2B, the AGC module 226 receives the output $U_V$ of the voltage controller 212, and the calculated RMS value of the rectified input voltage $V_{RECT(rms)}$. Each of these operating parameters is compared to a range of values. For example, the range of $U_V$ may be 0-1, and the range of $V_{RECT(rms)}$ may be 90V to 260V. At lower values of $U_V$, current controllers 228 with higher gains are selected, and at higher values of $U_V$, current controllers 228 with lower gains are selected. At lower values of $V_{RECT(rms)}$, current controllers 228 with lower gains are selected, and at higher values of $V_{RECT(rms)}$, current controllers 228 with higher gains are selected. These selections may be done, for example, using IF/THEN statements. For example: IF ($V_{RECT(rms)}$ is between 220V-260V AND $U_V$ is between 0.8 and 1.0) THEN select the current controller 228 having the lowest gain.

Under no-load or very light load conditions, very little current flows and very little energy is stored in the inductor 104. Under these conditions, the inductor may fail to provide current for the entire cycle so that current becomes discontinuous. In the PFC module 206 of FIG. 2B, the sampling and averaging module 222 samples the current $i_{SEN}$ multiple times during each switching cycle and averages the current samples to improve accuracy under discontinuous inductor current mode.

The voltage loop controller 212 and the current loop controllers 228 may be any conventional loop control algorithms such as proportional-integrative-derivative (PID) or various compensation filters. In one embodiment, each of the current loop controllers 228 is a two-pole two-zero compensation filter, implemented as firmware in a system controller, having the following general z-transform form:

$$G(z) = \frac{C_1 - C_2 z^{-1} + C_3 z^{-2}}{1 - C_4 z^{-1} + C_5 z^{-2}}$$

where the coefficients $C_1$-$C_5$ vary for each current loop controller 228 and they are selected to provide an appropriate gain and filter characteristic for selected combinations of $U_V$ and $V_{RECT(rms)}$.

It will be appreciated from this disclosure that a method for power factor correction may comprise adapting, by a system controller, characteristics of a current loop controller, in a power factor correction module, to control power factor.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A power supply, comprising: a power factor correction module having a plurality of current loop controllers, wherein the power factor correction module determines a first error signal and supplies the first error signal to a selected one of the plurality of current loop controllers, wherein the selected current loop controller is selected by the power factor correction module based upon a root-mean-square (RMS) value of an input voltage of the power supply and a second error signal, the second error signal being determined based on a difference between a reference voltage and an output voltage of the power supply; wherein the first error signal is determined based on the difference between a reference current and an output current of the power supply; and wherein the reference current is determined based on the product of a first factor, a second factor, the input voltage, and the inverse of the square of the RMS value of the input voltage, wherein the first factor is based on the value of the second error signal, and the second factor is a variable gain.

2. The power supply of claim 1, where each current loop controller is implemented as firmware in a system controller.

3. The power supply of claim 1, wherein each current loop controller is defined by a set of coefficients, and wherein the selected current loop controller is selected by selecting the coefficients corresponding to the selected current loop controller.

4. The power supply of claim 3, wherein each current loop controller is a two-pole two-zero compensation filter, and the set of coefficients for each current loop controller are coefficients for a two-pole two-zero compensation filter.

5. The power supply of claim 4, wherein the two-pole two-zero compensation filter has a z-transform given by $$G(z) = \frac{C_1 - C_2 z^{-1} + C_3 z^{-2}}{1 - C_4 z^{-1} + C_5 z^{-2}},$$

the coefficients being $C_1$, $C_2$, $C_3$, $C_4$, and $C_5$.

6. The power supply of claim 1, wherein the power factor correction module comprises a sampling and averaging module that samples the output current multiple times and averages the samples, wherein the averaged output current based on the samples is used in determining the first error signal.

7. The power supply of claim 1, wherein:
the power factor correction module includes a voltage controller that receives the second error signal and determines the first factor, the first factor having a range from 0 to 1; and
the RMS value of the input voltage has a range defined by a lowest value and a highest value.

8. The power supply of claim 7, wherein the lowest value is approximately 90V and the highest value is approximately 260V.

9. The power supply of claim 8, wherein each of the current loop controllers has a different respective gain, and wherein, when the first factor is between 0.8 and 1 and the RMS value of the input voltage is between 220V to 260V, a current loop controller having the lowest gain is selected by the power factor correction module.

10. The power supply of claim 7, wherein:
each of the current loop controllers has a different respective gain;
a first value of the first factor and a first RMS value of the input voltage results in the power factor correction module selecting a first current loop controller having a first gain; and
a second value of the first factor and a second RMS value of the input voltage results in the power factor correction module selecting a second current loop controller having a second gain;
the first value of the first factor is less than the second value of the first factor;
the first RMS value of the input voltage is greater than the second RMS value of the input voltage; and
the first gain is greater than the second gain.

11. The power supply of claim 1, comprising a rectifier that rectifies the AC voltage to produce the input voltage.

12. The power supply of claim 1, comprising a rectifier that rectifies the AC voltage to produce the input voltage.

13. The power supply of claim 12, wherein the rectifier is a full-wave rectifier.

14. The power supply of claim 12, comprising a switch controlled by the power factor correction module, wherein the switch is controlled by a pulse-width modulation (PWM) signal produced by the selected current loop controller.

15. An electronic device comprising:
a power supply that comprises:
a rectifier that receives an input voltage and produces a rectified input voltage;
an output voltage terminal that outputs an output voltage in response to the rectified input voltage;
an inductor arranged between a first terminal of the rectifier and the output voltage terminal;
a switch arranged between the inductor and a second terminal of the rectifier; and
a power factor correction module that outputs a control signal to control the switch, wherein the power factor correction module comprises:
a first input that receives a reference voltage;
a second input that receives the output voltage;
a third input that receives the rectified input voltage;
a fourth input that receives an output current of the power supply; and
a plurality of current loop controllers, each of the current loop controllers having a respective gain;
wherein the power factor correction module selects one of the plurality of current loop controllers based upon a difference between the reference voltage and the output voltage and a root-mean-square (RMS) value of the rectified input voltage, and supplies to the selected current loop controller an error signal based on the difference between a reference current and the output current, wherein the selected current loop controller produces the control signal in response to the error signal;
wherein the reference current is determined based on the product of a first factor determined based on the difference between the reference voltage and the output voltage, a variable gain, the rectified input voltage, and the inverse of the square of the RMS value of the rectified input voltage.

* * * * *